March 16, 1971     J. N. KORAL     3,570,141
EDUCATIONAL DEVICE FOR TEACHING SOLUBILITY
Filed Dec. 23, 1968
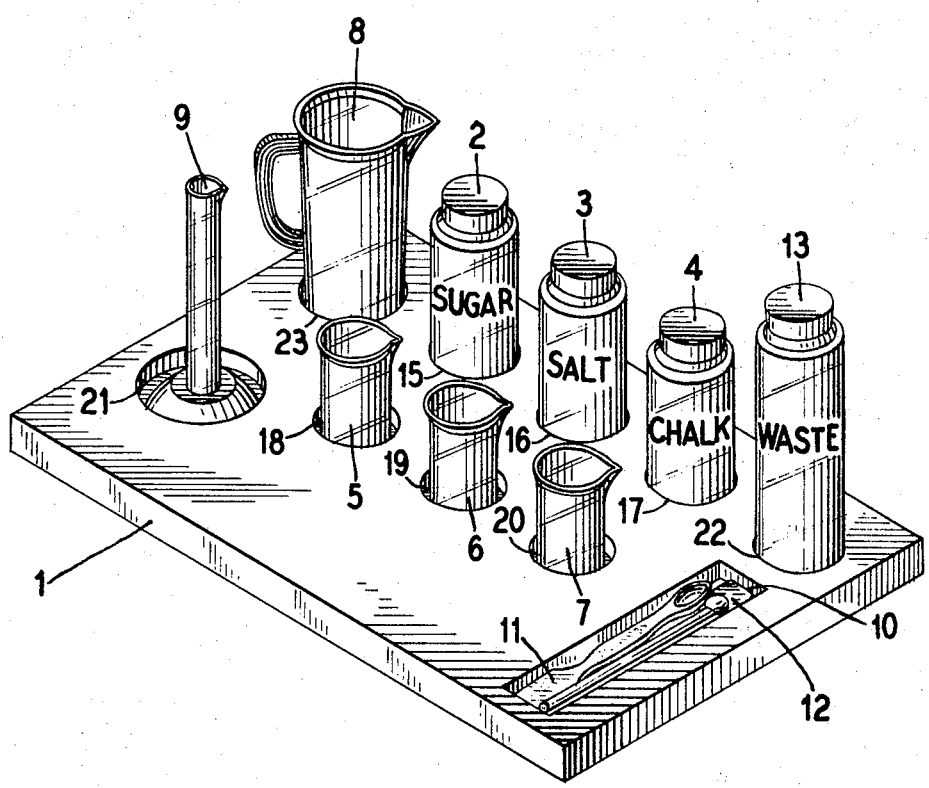
INVENTOR
JERRY N. KORAL
BY *Lawrence G. Kastriner*
ATTORNEY

United States Patent Office 3,570,141
Patented Mar. 16, 1971

3,570,141
EDUCATIONAL DEVICE FOR TEACHING SOLUBILITY
Jerry N. Koral, 34 Duke Drive,
Stamford, Conn. 06905
Filed Dec. 23, 1968, Ser. No. 786,043
Int. Cl. G09b 23/24
U.S. Cl. 35—18
7 Claims

ABSTRACT OF THE DISCLOSURE

An educational device for teaching young children the scientific concept of solubility. The preferred device consists basically of (1) several containers of different solid materials such as sugar, salt and chalk powder whose solubility is to be determined, (2) a number of containers, e.g. breakers for containing the liquid, e.g. water, in which the solids are to be dissolved, (3) means such as a graduated cylinder for measuring and transferring a given quantity of liquid into each beaker, (4) means such as spoons for measuring and transferring given amounts of each solid from the containers into the beakers, and (5) a baseboard containing spaces for receiving the various working parts, i.e. the containers of solid material, the beakers, the spoons and the graduated cylinder. The spaces on the baseboard also provide for an ordered arrangement of the various working parts.

INTRODUCTION

This invention relates, in general, to an educational device, and more specifically, to a scientific educational aid or kit suitable for teaching young children the concept of the solubility of solid matter in liquid, and at the same time to introduce them to the "scientific method."

BACKGROUND

Though we live in a technologically dominated society, in which life is being changed at an ever increasing rate by scientific discoveries, science to the great majority of people remains a mystery. This lack of scientific knowledge—even among the supposedly educated—is due primarily to the gross neglect of scientific education, particularly at the elementary and high school levels. Increased scientific knowledge at all levels is therefore necessary if we are to provide our future social and intellectual leaders with a view of life which will enable them to relate better to our rapidly changing environment, and if we are to increase their capacity for understanding, creating and guiding the future.

The need for beginning the educational process as early as possible has become accepted by educators and psychologists ever since it has become recognized that only the upper limits of a person's intelligence are fixed by his heredity, and that the extent to which a person realizes his potential intelligence depends on his environment—especially during his pre-school years.

Curiosity, the spur to all learning, causes children—beginning with infancy—to explore the world around them to find out how things work, and to experiment. It is now known that young children are far more perceptive than had been thought; they observe closely and are highly receptive to knowledge. In fact, the most rapid growth in intelligence takes place not in school, but during the pre-school years. It has been estimated that two-thirds of a person's intelligence is formed by the age of six. Furthermore, the older a child becomes, the greater becomes the effort required to produce a given change in his intelligence. Consequently, what a child learns in his pre-school years largely determines his future achievement.

Everything said about the importance of early education in general, is equally true of scientific education. In addition, since basic attitudes toward subjects, as well as a child's pattern of dealing with learning problems are formed at a very early age, it becomes important to instill good attitudes toward science and correct approaches to problem solving from the start.

In order to properly teach young children science, the educational technique must be pedagogically sound, scientifically correct, and physically safe.

A sound pedagogical approach makes the learning process an extension and an enrichment of the child's natural curiosity. Thus, it must give him a free rein to explore, to test, and to become involved. A prime pedagogical requirement, therefore, is to gear the educational activity to an individual student rather than to a class; that is, have it involve a student-experiment rather than a teacher-demonstration. Individual activity, enabling newly acquired knowledge to be verified by personal experience, invariably produces greater personal involvement and thereby leads to greater understanding.

Another attribute of sound pedagogical technique is to have minimum adult interference in the learning process. This can best be accomplished by providing the student with educational material which itself does the teaching, rather than the teacher. Such educational material must be designed to enable the child to work at his own pace, and should contain several levels of progressively greater intellectual challenge so that the child can match his intelligence to the proper level of challenge. Since the child will inherently make the proper match between his ability and one of the available levels of intellectual challenge, it will result in satisfaction on the child's part because of his successful mastery of the challenge. This, in turn, will generate motivation, keeping the child's interest high in the learning process. Thus, educational material should require only minimum assistance from the teacher or parent, such as an explanation or demonstration of how the material is to be used. Still another requirement for achieving minimum adult interference is to have the educational material self-correcting so that the child is able to determine for himself whether he has properly carried out the experiment. This eliminates the need for correction, praise, or other interference from the teacher and fosters personal satisfaction as the reward for correct solution of a problem.

Lastly, the educational material must be appealing to the child and contain an element of play so that the learning process becomes a pleasurable activity.

The requirement of scientific accuracy necessitates that the concepts to be taught be geared to the child's level of understanding without, however, sacrificing truthfulness by oversimplification to the point of inaccuracy. Furthermore, the educational technique should involve the "scientific method" as an integral part thereof; that is, be rational, experimental and objective. The experiment should have a clear and simple relationship between the operational steps involved and the scientific concept it is intended to teach. Stress in such experiments should be placed on operations fundamental to the "scientific method," such as perceptual discrimination, measurement, trial and error experimentation, and deduction. Such a method will teach not simply a scientific fact, but also an awareness of the scientific approach. These objectives can best be achieved by providing children with self-contained units of appealing instructional material with which the child is able to involve himself in a process of inquiry, akin to the way science is actually done.

Teaching scientific concepts to young children presents several special problems. One of these is the child's inability to read and therefore to follow written instructions. Where chemistry is involved, a pressing problem is one of safety, requiring that all experiments be performed with non-toxic or harmless materials. This requirement places severe limitations on experimental work, since the vast majority of chemical compounds are too toxic—at least if swallowed—to permit their being handled by young children. Furthermore, any device used must be capable of manipulation by children. Finally the problem presented in an experimental environment must be capable of a child's solution. Thus, it is evident that to improve the content and process of scientific education necessitates the development of new educational materials satisfying all of the above requirements.

OBJECTS

It is the primary object of this invention to provide an educational device suitable for teaching children, particularly young children the scientific concept of solubility of solid matter in liquid in a manner which is scientifically correct, pedagogically sound, and physically safe.

It is another object of this invention to provide an educational device suitable for teaching students the concept of solubility in a manner which is experimental, which is geared to an elementary level of understanding without sacrificing scientific truth, which makes the "scientific method" an integral part of the learning process, and which permits the student to involve himself in a process of inquiry akin to the way science is actually done.

It is still another object of this invention to provide an educational device suitable for teaching the scientific concept of solubility in a manner which is suited for personal involvement or individual activity, which requires minimum teacher interference, which is self-correcting, and which contains several levels of progressively greater intellectual challenge.

SUMMARY OF THE INVENTION

The above and other objects which will become apparent from the disclosure to follow, are achieved by the present invention, which comprises an educational device suitable for teaching the concept of the solubility of solid matter or material in liquid comprising, in combination:

(1) One or more solid containers suitable for containing solid matter whose solubility is to be determined, (2) One or more liquid containers suitable for containing the liquid in which said solid matter is to be dissolved, (3) Means for measuring and transferring a given quantity of said liquid into the containers suitable for containing the liquid, (4) Means for measuring and transferring a given quantity of said solid matter from their respective containers to said containers suitable for containing the liquid, and (5) A base containing a plurality of spaces suitable for receiving said containers suitable for containing the liquid and said containers suitable for containing the solid matter.

Preferably, spaces on the base are also provided for the means for measuring and transferring the liquid and the solid material. Spaces on the base board may also be provided for other optional component parts of the device, such as for example, a liquid storage container, a waste container, a funnel, a stand therefor, and filter paper.

THE DRAWING

A better understanding of the invention may be gained by reference to the accompanying drawing, in which the sole figure is a perspective view of a preferred embodiment of the present invention.

DETAILED DESCRIPTION OF THE INVENTION

Referring to the drawing, it can be seen that the device comprises a base member 1, having spaces 15, 16 and 17 therein for receiving containers 2, 3 and 4 suitable for containing the solid matter whose solubility is to be determined. These are wide mouth jars containing salt, sugar and chalk powder respectively. These three solids are preferred, since they are similar in appearance, yet their solubility varies considerably in water, the preferred liquid. They demonstrate the concept of solubility well, since sugar is highly soluble in water, salt moderately soluble, and chalk substantially insoluble. Of considerable importance also, where young children are concerned, is the fact that these solides are nontoxic.

Spaces 18, 19 and 20 are also provided on base 1 for receiving containers 5, 6 and 7 suitable for containing liquid. These are preferably beakers into which the liquid as well as the dissolved solids will be placed during the course of the experiment. A space 21 is provided for a graduated cyclinder 9 which is the means for measuring and transferring liquid from a liquid storage container such as pitcher 8 located in space 23 to each of the beakers 5, 6 and 7. If base 1 is to be used as a storage unit for the working parts of the experiment as well as a working surface for conducting the experiment, then a storage space 10 may also be provided for spatula 11 and stirring rod 12 or other appropriate means such as measuring spoons for measuring and transferring a given amount of solid from jars 2, 3 and 4 into breakers 5, 6 and 7.

It is important to note that base 1 with its spaces functions not merely as a convenient storage board for the various containers and utensils used in carrying out the experiment, but more importantly functions as an essential component part of the educational device by locking the working parts of the experiment into position. Such an ordered arrangement of the parts is essential if young children, i.e. children of pre-school or early elementary age, are to be able to carry out the experiment substantially on their own and with only minimal adult supervision. As such, base board 1 forms an essential component part of the invention.

Optionally, the device may also contain a waste jar 13 for disposing of used solutions and a space 22 therefor on base 1. The various containers, that is the beakers, jars, graduated cylinder and pitcher are preferably made of plastic for purposes of safety; however, they may be made of laboratory glass. Base board 1 may be made of wood, plastic, metal or other suitable material.

USE OF THE DEVICE

For a child to gain the maximum educational benefit from the present invention, he should be taught its proper use. The following method may be used. First, the child should be introduced to the various parts of the device, their names and their functions. The child is then ready to be shown how to carry out the experiment. Cylinder 9, which is preferably a 25 ml. graduate, is used to accurately measure volumes of liquid. The child should be shown how to fill it to the 25 ml. mark with water from pitcher 8. The measured volume of water should then be poured into one of the 100 ml. beakers, for example beaker 5. The remaining two beakers 6 and 7 should likewise be filled with the same amount of water, namely 25 ml. Next, the child should be instructed to transfer one measure, using a measuring spoon or spatula of sugar from jar 2 into beaker 5 directly in front of it. All of the sugar added will dissolve or disappear in the water upon stirring with rod 12. One measure of salt should now be transferred from salt jar 3 into beaker 6 containing 25 ml. water and stirred. The child should note that all the salt also dissolves. One measure of chalk powder should now be transferred from jar 4 into beaker 7 located directly in front of jar 4. It will be apparent to the child that the chalk powder did not dissolve in the water because of the cloudy white suspension which forms on stirring and which settles when not stirred.

Transfer of each of the solid material into the beaker directly in front of it is very important, since it helps the child to remember which solid was placed into which beaker. Without such corresponding alignment of the jars and beakers, and without their being locked into the spaces on the board, children tend to become confused. Without spaces on the board, as the experiment progresses the various beakers and bottles become disarranged, so that the child cannot tell which solids came from which beaker. If this happens, the self-corrective and self-teaching aspects of the unit become lost. In other words, the spaces on the board provide the unit and the experiment with structuring in both a physical and pedagogical sense which is necessary to maintain control over the intended course of the experiment.

The child has at this point in the experiment learned that while sugar and salt are soluble in water, chalk powder is not. He is now ready to learn the difference in their solubilities. To do this, the child is instructed to add three additional measures of salt and sugar from their respective jars 3 and 2 to each of the solutions in beakers 6 and 5 respectively. The child should note that all of the sugar in beaker 5 continues to dissolve, as evident from the clear solution, but that all of the salt in beaker 6 did not, and that when stirring is stopped some settles to the bottom of the beaker. From the above experiment, which the child should have done himself, though with instruction, he will have learned that different solids have different ranges of solubility, i.e. that more of one solid (sugar) will dissolve in water than another (salt), and that some solids (chalk) will not dissolve at all. The child should be taught that this property, called "solubility" can be used to characterize or distinguish these solids from each other.

With this learned knowledge, the child is now ready to carry out the determination of an unknown; that is, to perform a simple experiment in qualitative analysis and at the same time to test himself. In order that reading ability be unnecessary, the salt, sugar and chalk jars may be labeled, on one side only or on the bottom with an appropriate and easily recognizable picture or symbol of its contents (rather than words as shown on the drawing) so that the child can identify the solid material in the jar. With a clean set of beakers, and the jars turned so that the identifying labels are all facing away from the child, and their order rearranged in the spaces on the board, the child is ready to repeat the experiment in order to identify each solid in the jars by means of its solubility characteristic. Unlabeled jars of solids may, of course, be used in place of the labeled jars if testing rather than self-correction is desirable.

This part of the experiment is done by having the child first add 25 ml. of water to each of the three beakers using the graduated cylinder to measure it out, and then adding one measure of each solid to each of the beakers located respectively in front of the jar from which the solid was taken. This ordered placement is essential if confusion is to be avoided. The chalk, of course, will not dissolve making its identification simple. Next, the child is instructed to add three more measures of solid to each of the other two beakers, i.e. those containing the clear salt and sugar solutions. Again being sure that the solid is added to the beaker located in front of the jar from which the solid was taken. At this point, the salt will only dissolve in part, leaving some undissolved salt on the bottom of the beaker, whereas all of the sugar will again dissolve, rendering these two solids distinguishable by their relative solubility in water. The child can check the correctness of his identification of the solids by turning the jars around and observing the pictures identifying their contents.

By repeated performance of the experiment, the child will learn among other things, that sugar when added to water will disappear, i.e. dissolve in large quantities, that salt will do likewise but only in smaller amounts, and that some solid material such as chalk powder will not dissolve at all.

The present invention is intended primarily to stimulate and develop the intelligence of young children who are unable to read. However, it is ideally suited for all children whether readers or not, as well as adults who have no scientific knowledge, but who can find meaningful experience by doing things with their hands. For many children at the lower elementary level with poor reading ability, the present invention can provide an educational and true scientific experience with real success.

The present invention besides teaching the child the scientific concept of the solubility of solids in liquids and the concept of solutions, also helps to develop the child's capacity for thinking logically through his personal involvement in a child-level scientific investigation. It introduces the child to the "scientific method" by making him verify his assumptions (regarding the solubility of a solid) by his own personal experience (by dissolving it). It also helps the child to develop competence in volumetric measurement of liquids and solids, and in careful observation of results. In addition, it gives the child a feeling for the fact that solubility is a relative characteristic of matter.

While the invention is primarily intended for use as an aid to formalized eduction at the pre-school (nursery or kindergarten) level or lower elementary level, it should be understood that the invention is not limited to such use. It is also well-suited for use in the home as a scientific toy, since its proper use can easily be understood by a parent who can explain it to the child.

Various modifications of the above experiment will readily be apparent. Other non-toxic solids may be used in place of those given in the above illustration, for example ground silica in place of chalk powder, baking soda in place of salt, etc. Non-toxic solvents other than water may be used, for example mineral oil, vegetable oils or ethyl alcohol.

A variation on the above experiment is one which teaches that a particular solid has varying degrees of solubility in different solvents. For example, that sugar is highly soluble in water, but only slightly soluble in ethyl alcohol and insoluble in mineral oil. A device suitable for such an experiment would contain bottles of different solvents, a container for the solid, beakers for the solvents, and spaces for each of these items on the base board. The experiment could be carried out by pouring an equal volume of each solvent into a beaker located directly in front of each solvent bottle. One measure of solid is then added to each beaker of liquid and its solubility observed. Additional measures of solid are then added to each beaker until the solid no longer dissolves. Thus, the relative solubility of the solid in the different liquids is determined, i.e. the number of measures of solid which will dissolve in each of the liquids. As an unknown determination, the experiment is repeated to determine the identity of the solvent from its known ability to dissolve a given quantity of the solid.

An optional component which may be added to the basic unit heretofore described is a conventional or filtration funnel, a holder therefor and a supply of filter paper. With such an optional component the child can be taught through personal experience that a soluble material cannot be filtered, i.e., that when he pours the sugar solution through the filter the sugar will not be separated or filtered out, but that the chalk powder can easily be separated from the liquid by filtration. Likewise, it can be shown that only the undissolved portion of the salt can be separated by filtration, whereas the dissolved portion will go through the filter paper with the liquid.

The unit as described above is the preferred embodiment for young children; however, it will be readily apparent that the unit may be modified for use by older children or adults without departing from the basic concept of the invention. Such a modified unit may be accompanied by written instructions for the student, may use chemicals which are harmful if swallowed, and may use a flat surfaced base (such as a paper or plastic sheet) with the spaces simply marked thereon for the parts of the experiment, rather than a three dimensional board with indented spaces as shown on the drawing. The flat surfaced base with the spaces merely marked maintains the necessary pedagogical structure of the experiment without the additional physical structure required for young children. Furthermore, if toxicity is not a problem, the sugar, salt and chalk powder can be replaced by other combinations of solids and liquids. For example, if ethyl alcohol is used as the liquid or solvent, then titanium dioxide, urea and adipic acid may be used as the insoluble, moderately soluble and slightly soluble solids respectively. As another example, if benzene is used as the liquid, then zinc oxide, diphenyl and stearic acid may be used as the insoluble, moderately soluble and slightly soluble solid materials respectively. Other suitable combinations may, of course, be used. The above examples were chosen because they are easy to obtain, relatively non-toxic and non-irritating and therefore easy to handle.

Various modifications of the present invention, other than those described, will be apparent to those skilled in the art, without departing from the scope and spirit of the present invention. Consequently, it is to be understood that the present invention is not limited to the precise construction and methods described herein, these being merely illustrative of the principles and the preferred embodiments of the present invention.

What is claimed is:

1. An educational device suitable for teaching the concept of the solubility of solid matter in liquid, comprising, in combination:
    (1) one or more containers containing the solid matter whose solubility is to be determined, said containers being labeled to identify their respective contents in such manner as not to be visible to the user of the device when used in its intended manner,
    (2) one or more containers suitable for containing the liquid in which said solid matter is to be dissolved,
    (3) means for measuring and transferring a given quantity of said liquid into the containers suitable for containing the liquid,
    (4) means for measuring and transferring a given quantity of said solid matter from their respective containers to said containers suitable for containing the liquid, and
    (5) a three-dimensional base containing a plurality of intended spaces suitable for receiving (a) said containers suitable for containing the liquid, (b) said containers containing the solid matter, (c) said means for measuring and transferring liquid, and (d) said means for measuring and transferring said solid matter, and wherein said spaces for receiving said containers containing the solid matter and said spaces for receiving said containers suitable for receiving the liquid are equal in number and aligned one in front of the other.

2. The device of claim 1 wherein said device in addition contains a plurality of liquid storage means, and wherein said base contains spaces for said liquid storage means which are equal in number and aligned one in front of the other with the spaces on said base for receiving the containers suitable for receiving the liquid.

3. The device of claim 1 wherein said device in addition contains means for filtration.

4. The device of claim 1 wherein said device in addition contains liquid storage means, waste storage means and stirring means, and wherein said base contains spaces for each of said means.

5. The device of claim 4 wherein the number of said containers suitable for containing liquid is at least equal in number to the number of different solid materials whose solubility is to be determined.

6. The device of claim 5 wherein the number of containers suitable for containing solid matter is three, and wherein said containers respectively contain solid matter which is highly soluble, moderately soluble, and insoluble in water, and wherein said solid matter is non-toxic.

7. The device of claim 6 wherein the highly soluble solid matter is sugar, the moderately soluble solid matter is salt, and the insoluble matter is powdered chalk.

References Cited

UNITED STATES PATENTS 2,845,722   8/1958   Midgley _____ 35—18

OTHER REFERENCES

General Merchandise Company Catalog for Fall 1960 through Summer 1961, pp. 688, 689 only.

Welch Scientific Company Catalog, Rec'd Oct. 25, 1965, entitled "Scientific Apparatus and Supplies," pp. 539, 578, 580, 581 only.

HARLAND S. SKOGQUIST, Primary Examiner